US012646631B2

(12) United States Patent
Beinenz et al.

(10) Patent No.: US 12,646,631 B2
(45) Date of Patent: Jun. 2, 2026

(54) DEVICE, SYSTEM AND METHOD FOR DETECTING TRANSPORT BOATS

(71) Applicant: ALD Vacuum Technologies GmbH, Hanau (DE)

(72) Inventors: Frank Beinenz, Hanau (DE); Sven Herdler, Mömbris (DE); Johannes Fachinger, Altenstadt (DE)

(73) Assignee: ALD VACUUM TECHNOLOGIES GMBH, Hanau (DE)

( * ) Notice: Subject to any disclaimer, the term of this patent is extended or adjusted under 35 U.S.C. 154(b) by 1200 days.

(21) Appl. No.: 17/425,317

(22) PCT Filed: Jan. 21, 2020

(86) PCT No.: PCT/EP2020/051381

§ 371 (c)(1),
(2) Date: Jul. 22, 2021

(87) PCT Pub. No.: WO2020/156882

PCT Pub. Date: Aug. 6, 2020

(65) Prior Publication Data

US 2022/0084699 A1 Mar. 17, 2022

(30) Foreign Application Priority Data

Feb. 1, 2019 (DE) ..................... 10 2019 102 590.7

(51) Int. Cl.
*G21C 21/02* (2006.01)
*F27B 21/04* (2006.01)
(Continued)

(52) U.S. Cl.
CPC .............. *G21C 21/02* (2013.01); *F27B 21/04* (2013.01); *F27D 3/024* (2013.01); *F27D 19/00* (2013.01); *F27D 21/04* (2013.01); *G21C 3/623* (2013.01)

(58) Field of Classification Search
CPC .......... G21C 3/58; G21C 3/623; G21C 21/02; F27D 21/04; F27D 19/00; F27D 3/024; F27B 21/04; H01N 2221/058
See application file for complete search history.

(56) References Cited

U.S. PATENT DOCUMENTS 3,590,177 A * 6/1971 Ustin .................. H01H 21/285 200/17 R
3,649,785 A 3/1972 Dietrich
(Continued)

FOREIGN PATENT DOCUMENTS

CN 101297375 A 10/2008
CN 101384874 A 3/2009
(Continued)

OTHER PUBLICATIONS

Machine translation of DE 961263 C (Year: 1957).*
(Continued)

*Primary Examiner* — Nathaniel J Kolb
(74) *Attorney, Agent, or Firm* — Panitch Schwarze Belisario & Nadel LLP

(57) ABSTRACT

A device for detecting transport boats includes a contact element for contacting a transport boat, and a connecting element spring mounted in a housing of the device, biased into an initial position and linearly displaceably guided via a guide of the housing. The contact element is connected to the spring mounted connecting element and is displaceable together therewith in such a way that contact of the transport boat with the contact element causes deflection of the connecting element against the bias from the initial position into a detection position. The device further includes a detection device adapted to detect reaching of the detection position by the connecting element.

15 Claims, 1 Drawing Sheet

Figure 1:
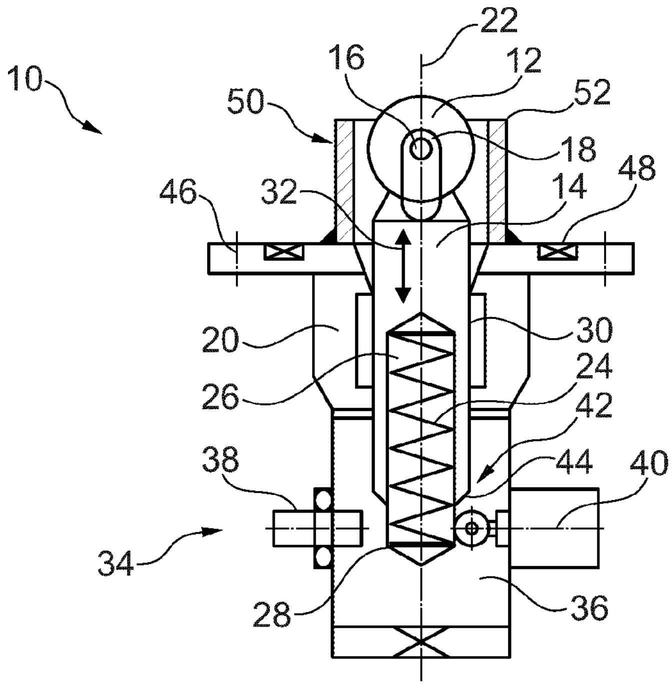

(51) Int. Cl.

| | |
|---|---|
| ***F27D 3/02*** | (2006.01) |
| ***F27D 19/00*** | (2006.01) |
| ***F27D 21/04*** | (2006.01) |
| *G21C 3/62* | (2006.01) |

(56) References Cited

U.S. PATENT DOCUMENTS

| | | | |
|---|---|---|---|
| 9,552,935 | B2 | 1/2017 | Franc |
| 2010/0044892 | A1 | 2/2010 | Pages |
| 2015/0096870 | A1 | 4/2015 | Franc |

FOREIGN PATENT DOCUMENTS

| | | | | | |
|---|---|---|---|---|---|
| CN | 207019473 | U | | 2/2018 | |
| CN | 108302938 | A | | 7/2018 | |
| DE | 961263 | C | * | 4/1957 | |
| DE | 202007002012 | U1 | | 6/2007 | |
| DE | 202013000140 | U1 | | 1/2013 | |
| EP | 1450384 | A1 | | 8/2004 | |
| GB | 1349642 | A | | 4/1974 | |
| JP | H02178592 | A | | 7/1990 | |
| KR | 101076737 | B1 | * | 10/2011 | ............. H01H 13/14 |

OTHER PUBLICATIONS

Machine translation of KR 101076737 (Year: 2011).*

Office Action issued Apr. 7, 2022 issued in European Application No. 20701457.2.

Office Action dated Oct. 28, 2022 in German Patent Application No. 102019102590.7 (machine translation).

Int'l Preliminary Examination Report issued Aug. 13, 2020 in Int'l Application No. PCT/EP2020/051381 (English Translation).

Office Action issued Oct. 8, 2019 in DE Application No. 10 2019 102 590.7.

"Positionsschalter," downloaded from web page: https://de.wikipedia.org/wiki/Positionsschalter, download date: Nov. 15, 2019, orignal posting date: Jan. 25, 2019, 1 page.

Int'l Search Report and Written Opinion issued Apr. 22, 2020 in Int'l Application No. PCT/EP2020/051381, translation of Int'l Search Report only.

Int'l Preliminary Examination Report issued Aug. 13, 2020 in Int'l Application No. PCT/EP2020/051381.

Office Action issued Feb. 23, 2024 in CN Application No. 202080011776.7.

Search report issued Jan. 13, 2023 in EP 20701457.2.

* cited by examiner

DEVICE, SYSTEM AND METHOD FOR DETECTING TRANSPORT BOATS

CROSS-REFERENCE TO RELATED APPLICATIONS

This application is a Section 371 of International Application No. PCT/EP2020/051381, filed Jan. 21, 2020, which was published in the German language on Aug. 6, 2020, under International Publication No. WO 2020/156882 A1, which claims priority under 35 U.S.C. § 119 (b) to German Application No. 10 2019 102 590.7, filed Feb. 1, 2019, the disclosures of each of which are incorporated herein by reference in their entireties.

The present invention relates to a device, a system and a method for detecting a position of transport boats, in particular of transport boats located in a space subjected to vacuum. The device, the system and the method are further used for guiding as well as mechanically securing the end position of transport boats. Transport boats within the meaning of the present invention may be referred to in English as "sintering shoes" and, according to the present disclosure, also comprise transport plates or workpiece carriers used in various technical applications.

BACKGROUND OF THE INVENTION

Transport boats, transport plates or workpiece carriers are used in a variety of technical fields for transporting cargo.

For example, transport boats are used in practice in the production of nuclear fuel elements for transporting MOX pellets (mixed oxide pellets) in sintering furnaces. The transport boats are loaded with fuel powder pressed into MOX pellets in order to subsequently move these MOX pellets within a facility by means of the transport boats. For example, the transport boats are moved into a sintering furnace to sinter the MOX pellets loaded on them at temperatures of 200° C. to 2000° C. and a pressure between 80 kPa and 120 kPa. The MOX pellets are then transported further, for example by means of the transport boats, for subsequent unloading.

In order to move the transport boats, transport plates or workpiece carriers in a targeted, safe and precise manner in a facility and, for example, to move them from station to station in a desired manner, it is necessary to determine the position of the transport boats.

It is therefore a task of the present invention to provide a device, a system and a method that enable detecting a position of transport boats. In particular, the device, the system and the method are to be applicable in an environment subjected to vacuum.

The tasks are solved by a device, a system and a method according to the independent patent claims. Further embodiments and embodiments of the device, the system and the method are the subject of the dependent claims and the description below.

DESCRIPTION OF THE INVENTION

One aspect of the invention relates to a device for detecting transport boats, in particular for detecting a position of a transport boat. The device comprises a contact element for contacting a transport boat and a connecting element spring mounted in a housing of the device. The connecting element is biased into an initial position and is linearly displaceably guided via a guide of the housing. Preferably, the connecting element has an elongated shape with a longitudinal axis and is displaceable in the housing along the longitudinal axis. The contact element of the device according to the invention is connected to the spring mounted connecting element and is displaceable together therewith in such a way that contact of the transport boat with the contact element causes deflection of the connecting element against the bias from the initial position into a detection position. For this purpose, the contact element can be attached in particular to an end of the connecting element opposite the spring mounting. Accordingly, the contact element and the connecting element are each biased into an initial position and can be deflected from this respective initial position into a detection position by a contact of the transport boat with the contact element against the bias. The device further comprises a detection device adapted to detect a reaching of the detection position by the connecting element. In other words, a deflection of the contact element by the transport boat is thus detectable by means of the detection device.

The deflection of the connecting element or the contact element by the transport boat, which can be detected by means of the detection device, and the reaching of the detection position caused thereby enables conclusions to be drawn about the position of the transport boat and thus the position of the transport boat to be detected. Since the device is arranged at a defined position in an overall system that is known to the user, the position of the transport boat contacting the contact element can be detected, for example, when the detection device is triggered. In one embodiment, the detection of reaching the detection position can be linked to the associated time of detection and/or to further facility/process parameters. For example, the detection of reaching the detection position can also be linked to characteristics of the shape and/or dimensions of the transport boat.

It is understood that the position of the transport boat can also be detected by the connecting element moving from the detection position, for example temporarily, back to the initial position. For example, the contact element may be in contact with a transport boat and held by it against the bias in the detection position while the transport boat moves along the contact element in the direction of motion. During this period, the detection device permanently detects the connecting element reaching or maintaining the detection position. In one embodiment, the transport boat may have a recess on a surface facing the device. As soon as this recess reaches the contact element, the latter is displaced back to the initial position due to the sping mounting of the connecting element. The detection device thus suddenly no longer detects a detection position and can then generate a corresponding signal, allowing conclusions to be drawn about the position of the transport boat. In this case, the position could be determined precisely, for example, since the position of the recess on the transport boat is known. The above principle can also be applied to transport boats without a recess. Here, the connecting element can be moved back to the initial position when the contact element comes out of contact with the transport boat, i.e. as soon as the latter has moved past the device. However, this variant is only possible if there is no direct contact between successive transport boats.

The initial position can be a position of the connecting element (and the contact element) in which the contact element does not contact the transport boat, i.e. is not impacted by a transport boat. Alternatively, the initial position can be a position of the connecting element (and the contact element) in which the contact element is already contacting the transport boat, but is not yet pressed into a detection position by the transport boat. In this case, the transport boat may, for example, have a projection on a surface facing the device. As soon as this protrusion comes into contact with the contact element, it presses the connecting element into the detection position via the contact element.

Since detecting reaching of the detection position according to the present invention is caused by the mechanical deflection of the contact element and the connecting element, the device according to the present invention enables substantially mechanically or mechanically caused detecting of the position of transport boats. This makes it possible to use the device in a space subjected to vacuum or in other environmental conditions straining the device and still ensure reliable detecting.

The detection position may be such that it is not considered to have been reached until the connecting element has a predetermined minimum deflection. In other words, the detection device may be adapted to detect deflection only when the connecting element has this predetermined minimum deflection. This can be achieved by the detection device being able to detect and distinguish between a plurality of positions of the connecting element, and defining the reaching of the detection position by the connecting element as such only when the minimum deflection is reached or exceeded. Alternatively or additionally, the detection device can be designed such that it can detect the connecting element only when the predetermined minimum deflection is reached and thus determine that the detection position has been reached.

For example, this minimum deflection can correspond to a maximum deflection achievable by the contact of a transport boat with the contact element. Preferably, the minimum deflection may be 5 mm, preferably 3 mm less, more preferably 1.5 mm, still more preferably 1 mm less than this maximum achievable deflection.

The detection device may further be adapted to generate and transmit a corresponding signal to a control system upon detection of the reaching of a respective detection position by the connecting element/by the contact element or upon detection of the deflection of the contact element by the transport boat. The controller may be provided as a component of the device according to the invention, of the system according to the invention, or as a separate component.

In one embodiment of the device, the contact element may be a contact roller rotatably mounted on a first end (the end opposite to the spring mounting) of the connecting element. This contact roller may be connected to the connecting element by means of a bolt. For example, the contact roller may have a central bore and be arranged between two arms of a bifurcated end section of the connecting element, the bolt being guided through one bore of each of the two arms. The contact roller may be simultaneously deflected by the contact or force of the transport boat engaging it and rotated by the movement of the transport boat, allowing it to move onward and guiding the transport boat. Depending on the arrangement of the device relative to the incoming direction of motion of the transport boat, the direction of motion of the transport boat can be maintained or deflected, for example, by 90°.

Alternatively, the contact element may be a slide bar. For example, the slide bar may be attached to the first end of the connecting element by means of a bolt or screw connection. In a further embodiment, a slide bar may be connected to at least two connecting elements of two devices. In other words, at least two devices may comprise a common slide bar connecting the devices. In this case, the contact element is considered a portion of the common slide bar. The slide bar may be configured to allow a transport boat to slide along the slide bar along at least one axis of the slide bar, preferably along at least two substantially mutually orthogonal axes of the slide bar. This allows the transport boat coming into contact with the slide bar, or more precisely its direction of motion, to be maintained or deflected, for example by 90°.

In a further development, the contact element and the connecting element connected thereto can be arranged rotationally fixed in the housing. For this purpose, for example, the contact element, the connecting element and the housing may be interconnected by a bolt which extends through bores in the contact element and the connecting element and is displaceably received at opposite ends in a respective associated slotted hole of the housing. The slotted holes of the housing may be arranged opposite each other and extend substantially parallel to the longitudinal axis of the connecting element. Thus, the slotted holes may prevent rotation of the contact element and the connecting element in the housing about the longitudinal axis of the connecting element while permitting displacement of the contact element and the connecting element along the longitudinal axis. This displacement may in particular be a vertical displacement. The upper stop and the lower stop may also define the end positions of the contact element and the connecting element connected thereto. For example, the upper stop may define the initial position to which the contact element and the connecting element are biased.

In one embodiment of the device, the connecting element may be a shaft that preferably has a non-circular cross-sectional area.

In one embodiment of the device, the connecting element may have a recess in which at least a portion of a spring element is accommodated for implementing the spring mounting. This recess may extend, for example, from a second end of the connecting element opposite the end, i.e. an end facing away from the contact element, in the direction of the first end. The recess may have a non-circular cross-section and be arranged coaxially with the connecting element. The spring element may be a mechanical spring element, preferably a helical spring. This further improves the safe usability of the device under stressful environmental conditions. The spring element can be supported with one end via a connecting element-side stop in the recess opposite the connecting element and with an opposite end via a housing-side stop opposite the housing. The stops are formed opposite each other. The spring element may be arranged coaxially with the connecting element.

In a further embodiment of the device according to the invention, the connecting element can comprise an end section facing away from the contact element, which is detected by the detection device when the detection position is reached by the connecting element. Accordingly, the end section may be formed at the second end, that is, the end remote from the contact element, of the connecting element. For example, the end section may be detected or detectable by the detection device when the end section has reached and/or exceeded a predetermined limit point.

In particular, the end section of the connecting element facing away from the contact element may comprise a slant. For example, the end section may be a chamfer terminating the connecting element, particularly in the case of a connecting element in the form of a shaft.

In one embodiment, the housing may have a substantially cylindrical shape. In this case, the housing may preferably be sleeve-shaped. The guide of the housing guiding the connecting element may be formed by a portion of the inner peripheral surface of the sleeve-shaped housing. Alternatively, a sliding guide may be provided on a portion of the inner peripheral surface of the housing, for example in the form of a pressed-in further metal or plastic sleeve.

In a further embodiment of the device, the housing may comprise a flange by means of which the device is connectable or connected in a sealed manner to a portion or region of an associated adjacent facility subjected to vacuum. This flange may be formed circumferentially around the outer periphery of a housing formed in a substantially cylindrical shape. In this case, the flange may have a circular ring shape and be coaxial with the housing.

The housing may be formed in one piece or in multiple pieces.

In one embodiment, the device according to the invention, in particular the housing, may comprise a fixed stop for mechanically securing the end position of the transport boat. The contact element, more specifically an upper end of the contact element, may extend outwardly beyond the fixed stop by a predetermined distance when viewed in the initial position of the connecting element in the direction of the transport boat to be detected. In addition, the contact element, more specifically the upper end of the contact element, may be maximally in line with or behind the fixed stop when the connecting element is in the detection position as viewed in the direction of the transport boat to be detected. The upper end of the contact element may describe the point of the contact element that is spaced farthest in a direction away from the spring mounting. It is understood that in the case of a rotating contact roller, the upper end always describes the point of the roller that is spaced farthest in a direction away from the spring mounting.

The fixed stop for mechanically securing the end position of the transport boat ensures that in the event of a malfunction, for example if the detection device does not detect anything despite the connecting element reaching the detection position, does not generate a signal and/or remains in the detection position, the movement of the transport boat against the bias is limited by the fixed stop. In addition, the transport boat can slide along the fixed stop and the process does not necessarily have to be interrupted, although detection is limited. This can be particularly advantageous in a redundantly implemented facility.

The predetermined distance can be, for example, a maximum of 1 cm, preferably a maximum of 7 mm, preferably a maximum of 5 mm, further preferably a maximum of 3 mm. A small distance is advantageous because the position of the transport boat is only insignificantly changed in the event of a malfunction due to which the transport boat comes into contact with the fixed stop.

In a further embodiment, the housing may have a sleeve-shaped end section with an end face, said end face forming the fixed stop. The fixed stop may thus have an annular cross-sectional area. For example, the sleeve-shaped end section may be thinner walled than the remainder of the housing in which the components of the spring mounting and the detection device are arranged. In particular, the sleeve-shaped end section may extend from the flange in the direction of away from the spring mounting.

In one embodiment of the device according to the invention, the detection device may comprise a non-contact sensor and/or a position switch, in particular a mechanical limit switch. Accordingly, the detecting device may comprise one or more identical or different sensors. The sensor (s) may be integrated and aligned in the housing to detect the position of the connecting element arranged in the housing.

For example, the non-contact sensor may be an inductive sensor. This can detect reaching of a detection position when the end section of the connecting element facing away from the contact element (comprising a slant, for example) moves into a measuring field of the inductive sensor. The detection position can be defined by the arrangement of the inductive sensor or its measuring field and the arrangement of the connecting element relative thereto.

The mechanical limit switch may be integrated and aligned in the housing such that it is actuated by moving the connecting element and thereby causing the slants of the end section of the connecting element remote from the contact element to contact the mechanical limit switch. It is understood that the mechanical limit switch is not fully actuated and detects reaching of the detection position until the slant has been displaced sufficiently far. For example, it may be intended that the mechanical limit switch is not fully actuated and detects reaching of the detection position until the end portion of the connecting element comprising the slant has been displaced past the mechanical limit switch so that the mechanical limit switch comes into contact with the portion of the connecting element adjoining the end portion.

Both the inductive sensor and the mechanical limit switch have low wear and are suitable for use in a space subjected to vacuum or other environmental conditions stressing the device, and yet still provide reliable operation of the device.

The invention further relates to a system for detecting and guiding transport boats. The system comprises at least one device of the type described above and at least one transport boat moved in a direction of motion or retrieval. The at least one transport boat may be planar on the surface facing the device, comprising a recess, and/or comprising a protrusion. It is understood that the system may comprise multiple identical or different devices of the type described above. Also, the system may comprise a plurality of transport boats.

In a further embodiment of the system, the at least one device may be arranged orthogonal to the direction of motion of the at least one transport boat. For example, the at least one device may thus come into contact with an underside of the at least one transport boat.

Alternatively or additionally, the at least one or more devices of the type described above may be arranged in the direction of motion of the at least one transport boat. For example, the at least one device may thus come into contact with a lateral or front end face of the transport boat as viewed in the direction of motion.

In one embodiment of the system, the at least one device may be arranged in the path of motion of the at least one transport boat such that they do not affect the direction of motion or such that they change the direction of motion of the transport boat, for example by deflecting it by 90°. The at least one device may thus also serve to guide the at least one transport boat while detecting its position.

In a further embodiment, the system may comprise a controller. The detection device may be adapted to generate and transmit a corresponding signal to the controller upon detection of the reaching of a respective detection position by the connecting element. The controller can be adapted to set this signal in relation to temporal parameters and/or stored parameters, such as the position of the device in the system or the geometry of the transport boat, and to accurately determine the position of the transport boat therefrom. Also, in accordance with the determined position of the transport boat or in accordance with the received signal from the detection device, the controller can adjust a speed of movement at which the transport boat is moved.

The invention further relates to a method for detecting transport boats. In particular, the method may be carried out by means of a device or system of the type described above. The method comprises the steps of:

- contacting a contact element by means of a transport boat,
- deflecting a spring mounted connecting element connected to the contact element against the bias from an initial position into a detection position,
- detecting a reaching of the detection position by the connecting element by means of a detection device.

It is understood that deflection of the spring mounted connecting element connected to the contact element against the bias from an initial position to a detection position is caused by contacting the contact element by means of the transport boat.

The method may further comprise the step of: Shifting the connecting element (and the contact element connected thereto) back from the detection position to the initial position due to the bias caused by the spring mounting. The shifting back may occur once there is no longer contact between the contact element and the transport boat.

The foregoing steps, as well as other steps resulting from the foregoing description, may be repeated and performed multiple times.

Although some aspects and features are described above and below only with respect to the device for detecting transport boats, these aspects and features may apply mutatis mutandis to the system and/or method for detecting transport boats, and vice versa.

BRIEF DESCRIPTION OF THE FIGURES embodiment examples of the present invention are described in more detail below with reference to the accompanying schematic figures. They represent:

FIG. 1 a lateral sectional view of a device for detecting transport boats according to an embodiment example of the invention.

Figure 2:
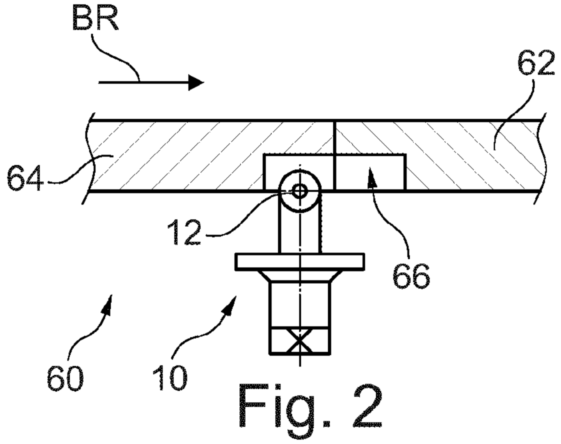

FIG. 2 a simplified side view of an embodiment example of the system according to the invention illustrating a first arrangement of the device relative to transport boats.

Figure 3:
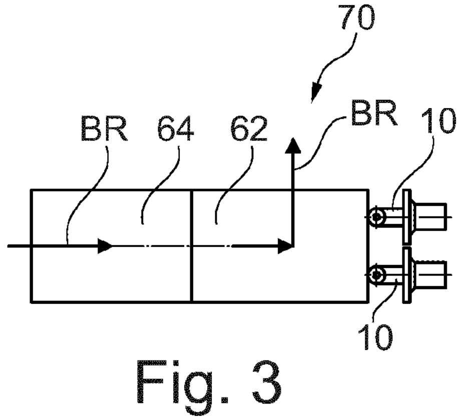

FIG. 3 a simplified top view of another embodiment example of the system according to the invention for illustrating a second arrangement of the device relative to transport boats.

Figure 4:
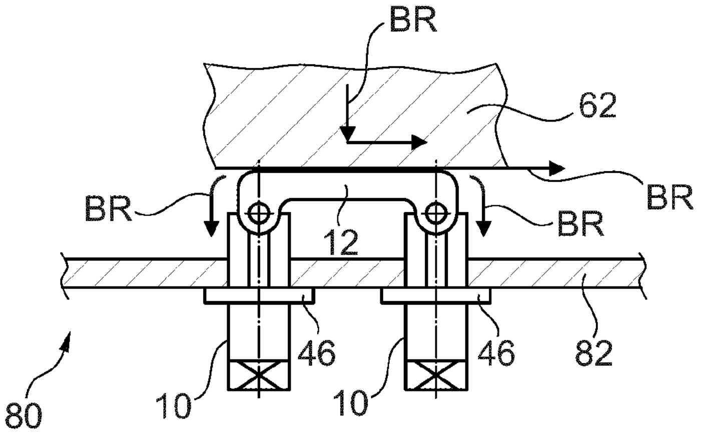

FIG. 4 a simplified top view of still another embodiment example of the system according to the invention for illustrating a third arrangement of the device relative to transport boats.

FIGURE DESCRIPTION

Identical reference signs in the figures indicate identical or analogous elements.

FIG. 1 shows an embodiment example of a device 10 having a contact element 12 for contacting a transport boat (not shown in FIG. 1). In the example shown, the contact element 12 is formed as a contact roller. The contact element 12 is rotatably attached to an upper end of a connecting element 14 of the device 10 and thus connected thereto. For this purpose, a bolt 16 is passed through associated bores in the contact element 12 and the connecting element 14. This bolt 16 terminates on both sides in a respective slotted hole 18 formed in a housing 20 of the device 10. Due to the arrangement of the two ends of the bolt 16 in the slotted holes facing each other (only one slotted hole 18 indicated in FIG. 1), the contact element 12 and the connecting element 14 connected thereto are rotationally fixed in the housing 20 with respect to the longitudinal axis 22 of the connecting element 14.

The connecting element 14 is in the form of a shaft and is spring mounted in the housing 20 by means of a metallic helical spring 24. For this purpose, the helical spring 24 is accommodated in sections in a recess 26 of the connecting element 14. Starting from an end of the connecting element 14 facing away from the contact element 12, the recess 26 extends upwards in the direction of the contact element 12. A lower end section of the helical spring 24 is supported against an inner housing stop 28. The helical spring 24 biases the connecting element 14 and the contact element 12 connected thereto into the initial position shown in FIG. 1. In this initial position, the contact element 12 is not in contact with any transport boat.

The connecting element 14 is arranged substantially coaxially with the cylindrical housing 20 inside the housing 20 and is linearly displaceably guided along the longitudinal axis 22 via a guide 30 of the housing 20, as illustrated by the double arrow 32. The slotted holes 18, in which the ends of the bolt 16 are supported, ensure that the displacement of the connecting element 14 and the contact element 16 in the direction of the double arrow 32 is possible despite the anti-rotation device. In the example shown, the maximum theoretical displaceability of the assembly of contact element 12 and of connecting element 14 is determined by the upper and lower ends of the slotted holes 18 and the abutment of the bolt 16 against these ends, respectively.

The contact element 12 and the connecting element 14 are jointly displaceable by virtue of their interconnection in such a manner that contact of a transport boat (not shown in FIG. 1) with the contact element 12 causes deflection of the connecting element 14 against the bias by the helical spring 24 from the initial position to a detection position.

As can be further seen in FIG. 1, the device comprises a detection device 34 adapted to detect the connecting element 14 reaching the detection position. The detection device 34 is arranged in a lower region of the housing 20. In the embodiment example shown, the lower region of the housing 20 is in the form of a sleeve or pot 36. This pot 36 is fixedly and sealingly connected to the adjoining region of the housing 20, which comprises the guide 30.

In the embodiment example shown, the detection device 34 comprises two sensors, namely a non-contact inductive sensor 38 and a mechanical limit switch 40. It is understood that in alternative embodiment examples, the detection device may comprise only one sensor or two sensors of the same type. Also, the detection device may comprise more than two sensors.

The inductive sensor 38 is attached to the pot 36 from the outside in such a way and the mechanical limit switch 40 is integrated into the pot 36 such that when the connecting element 14 reaches a predetermined detection position, an end section 42 of the connecting element 14 facing away from the contact element is detected by the two sensors 38, 40. In the embodiment example shown, the end section 42 of the connecting element 14 facing away from the contact element is in the form of a chamfer closing off the connecting element 14. The end section 42 thus comprises the slant 44 shown.

As can be seen from FIG. 1, the inductive sensor 38 can detect the reaching of a detection position of the connecting element 14 when the end section 42 or the slant 44 moves into a measuring field of the inductive sensor 38. Further, the mechanical limit switch 40 may be actuated by displacing the connecting element 14, thereby causing the slants 44 to contact the mechanical limit switch 40.

Since the displacement of the connecting element 14 from the initial position to the detection position via the contact element 12 is caused by the transport boat acting thereon against the bias, the position of the transport boat can be detected thereby. For example, the exact position of the device 10 in an overall system can be known for this purpose. To that end, the device 10 shown in FIG. 1 can be connected or become connected to a facility wall via a flange 46 provided on the housing 20. More precisely, the device 10 is screwed or can be screwed to the facility wall, for example, via the flange 46. In order to ensure a tight connection between the facility and the device 10, a circumferential seal 48 is provided in the flange 46, for example in the form of an O-ring arranged in a groove.

Upon detecting the connecting element 14 reaching the predetermined detection position, the detection device 34 may generate and transmit a corresponding signal to a controller (not shown). The controller may relate this signal to temporal parameters and/or stored parameters, such as the position of the device 10 in the overall system or the geometry of the transport boat, and use it to accurately determine the position of the transport boat. Also, in accordance with the previously determined position of the transport boat or in accordance with the received signal from the detection device 34, the control system can change a speed of movement with which the transport boat is moved.

In order to increase the safety of the overall system or of a performed process in the event of a malfunction, the illustrated device 10 is provided with a fixed stop for mechanically securing the end position of the transport boat. For this purpose, the housing 20 comprises a sleeve-shaped upper end section 50 with an end face 52 which forms the fixed stop. The fixed stop 52 for mechanically securing the end position of the transport boat makes it possible, for example, if the detection device 34 does not generate a signal despite the connecting element 14 reaching the detection position and/or the connecting element 14 remains in the detection position, for the movement of the transport boat against the bias to be limited by the fixed stop 52. Moreover, the transport boat can slide along the fixed stop 52 and the process does not necessarily have to be interrupted, although the detecting is limited.

In the embodiment example shown, in the initial position (FIG. 1) of the connecting element 14, an upper end of the contact element 12 projects outwardly beyond the fixed stop 52 by a predetermined distance of about 3 mm. In the detection position (not shown) of the connecting element 14, the upper end of the contact element 12 is maximally in line with the fixed stop 52.

FIG. 2 shows an embodiment example of a system 60 comprising a device 10 and two interconnected transport boats 62, 64. In the arrangement shown in FIG. 2, the device 10 is arranged orthogonal to the direction of motion BR of the transport boats 62, 64 below them.

In the example shown, the transport boats 62, 64 comprise a recess 66 on an underside thereof. As long as the underside of the transport boats 62, 64 is in contact with the contact element 12 of the device 10, the connecting element 14 is in the detection position due to the force applied by the transport boats 62, 64. As soon as the contact element 12 enters the area of the recess 66, the connecting element 14 shifts to the initial position due to the bias applied by the helical spring. This change from the detection position to the initial position is detected by a control system, since the detection device 34 then no longer generates a signal or detects a detection position. This allows the exact position of the two transport boats to be detected.

FIG. 3 shows another embodiment example of a system 70 with two devices 10 and two interconnected transport boats 62, 64. In this example, the two devices 10 are arranged in the direction of motion BR of the transport boats 62, 64. As a result, the two devices 10 or their contact elements come into contact with a front end face of the front of the two transport boats 62, 64. This contact causes a displacement of the respective connecting element of the two devices 10 from an initial position into a detection position, whereby the position of the transport boats can be detected. At the same time, the devices 10 serve here for guiding the transport boats 62, 64, more precisely for deflecting their direction of motion BR by 90°.

FIG. 4 shows another embodiment example of a system 80 comprising two devices 10 and a transport boat 62. The devices 10 are connected to a facility wall 82 via flanges 46 provided on their respective housings. In the example of FIG. 4, the two devices 10 are also arranged in the direction of motion BR of the transport boat 62. As a result, the two devices 10 or their contact elements come into contact with a lateral end face of the transport boat 62. This contact causes a displacement of the respective connecting element of the two devices 10 from an initial position into a detection position, whereby the position of the transport boat can be detected.

At the same time, also in this embodiment example, the devices 10 serve for guiding the transport boat 62, more precisely for deflecting its direction of motion BR by 90°. In contrast to the example according to FIG. 3, the two devices 10 comprising a common slide bar as contact element 12. The slide bar allows the transport boat 62 to slide along two substantially orthogonal axes of the slide bar. This allows the transport boat 62 in contact with the slide bar to be deflected 90° to the direction of motion in two different directions (in FIG. 4, out of the plane of the image or into the plane of the image, or to the right or to the left).

It will also be understood that further combinations of the above-described embodiment examples are possible, for example different combinations of the systems 60, 70 and/or 80.

LIST OF REFERENCE SIGNS

10 device
12 contact element
14 connecting element
16 bolt
18 slotted hole
20 housing
22 longitudinal axis of connecting element
24 helical spring
26 connecting element recess
28 housing stop
30 guide
32 displacement direction
34 detection device
36 pot
38 inductive sensor
40 mechanical limit switch
42 end section of connecting element
44 slant
46 flange
48 seal
50 upper end section of housing
52 fixed stop

60 system of a first embodiment
62 transport boat
64 transport boat
66 recess of the transport boat
70 system of a second embodiment
80 system of a third embodiment
82 facility wall
BR direction of motion

The invention claimed is:

1. A device (10) for detecting transport boats (62, 64), comprising:

a contact element (12) for contacting a transport boat (62, 64)

a connecting element (14) spring mounted in a housing (20) of the device (10), biased into an initial position and linearly displaceably guided via a guide (30) of the housing (20), the contact element (12) being connected to the spring mounted connecting element (14) and being displaceable together therewith in such a way that contact of the transport boat (62, 64) with the contact element (12) causes deflection of the connecting element (14) against the bias from the initial position into a detection position, and a detection device (34) adapted to detect a reaching of the detection position by the connecting element (14), wherein the contact element (12) and the connecting element (14) connected thereto are arranged rotationally fixed in the housing (20), the connecting element (14) and the housing (20) being interconnected via a bolt (16) which extends through bores in the contact element (12) and the connecting element (14) and is displaceably received at opposite ends in a respective associated slotted hole (18) of the housing (20).

2. The device (10) according to claim 1, wherein the contact element (12) is a slide bar or a contact roller rotatably mounted on a first end of the connecting element (14).

3. The device (10) according to claim 1, wherein the connecting element (14) is a shaft.

4. The device (10) according to claim 1, wherein the connecting element (14) has a recess (26) in which at least a portion of a spring element (24) is accommodated.

5. The device (10) according to claim 1, wherein the connecting element (14) comprises an end section (42) facing away from the contact element (12), which end section is detected by the detection device (34) when the contact element (14) reaches the detection position.

6. The device (10) according to claim 5, wherein the end section (42) of the connecting element (14) facing away from the contact element (12) comprises a slant (44).

7. The device (10) according to claim 1, wherein the housing (20) has a substantially cylindrical shape.

8. The device (10) according to claim 1, wherein the housing (20) comprises a flange (46) by means of which the device (10) is connectable or connected in a sealed manner to a vacuum subjected portion of an associated facility.

9. The device (10) according to claim 1, further comprising a fixed stop (52) for mechanically securing the end position of the transport boat (62, 64), wherein the contact element (12) in the initial position of the connecting element (14) in the direction of the transport boat (62, 64) to be detected, the contact element (12) protrudes outwardly beyond the fixed stop (52) by a predetermined distance, and wherein the contact element (12) is maximally in line with the fixed stop (52) when the connecting element (14) is in the detection position as viewed in the direction of the transport boats (62, 64) to be detected.

10. The device (10) according to claim 9, wherein the predetermined distance is at most 1 cm.

11. The device (10) according to claim 9, wherein the housing (20) comprises a sleeve-shaped end section (50) with an end face forming the fixed stop (52).

12. The device (10) according to claim 1, wherein the detection device (34) comprises at least one of a non-contact sensor (38) or a mechanical limit switch (40).

13. A system (60, 70, 80) for detecting and guiding transport boats (62, 64), comprising at least one device (10) according to claim 1 and at least one transport boat (62, 64).

14. A method for detecting transport boats (62, 64) via the device of claim 1, the method comprising the steps of:

contacting the contact element (12) by means of the transport boat (62, 64), deflecting the spring mounted connecting element (14) connected to the contact element (12) against the bias from the initial position into the detection position, detecting the reaching of the detection position by the connecting element (14) by means of the detection device (34).

15. The device (10) according to claim 1, wherein the contact element (12) and the connecting element (14) connected thereto are rotationally fixed in the housing (20) by the contact element (12).

* * * * *